United States Patent [19]

Brown

[11] Patent Number: 4,994,253
[45] Date of Patent: * Feb. 19, 1991

[54] PROCESS FOR THE PRODUCTION OF LARGE BOEHMITE PARTICLES

[75] Inventor: Neil Brown, Bonn, Fed. Rep. of Germany

[73] Assignee: Vereinigte Aluminium-Werke AG, Fed. Rep. of Germany

[*] Notice: The portion of the term of this patent subsequent to May 26, 2004 has been disclaimed.

[21] Appl. No.: 240,406

[22] Filed: Aug. 30, 1988

Related U.S. Application Data

[63] Continuation of Ser. No. 17,281, Feb. 20, 1987, abandoned, which is a continuation-in-part of Ser. No. 847,634, Apr. 3, 1986, Pat. No. 4,668,486, and a continuation-in-part of Ser. No. 17,308, Feb. 20, 1987, abandoned.

[51] Int. Cl.$^5$ ............................................. C01F 7/00
[52] U.S. Cl. ................................... 423/111; 423/121; 423/122; 423/123; 423/127; 423/129; 423/130; 423/131; 423/625; 423/628; 423/629; 423/630; 501/153
[58] Field of Search ............... 423/130, 123, 131, 111, 423/121, 129, 122, 127, 625, 630, 628, 629, 124; 501/153, 100

[56] References Cited

U.S. PATENT DOCUMENTS

| | | |
|---|---|---|
| 1,943,786 | 1/1934 | Cowles ............................... 423/124 |
| 4,046,855 | 9/1977 | Schepers et al. .................... 423/130 |
| 4,101,629 | 7/1978 | Mercier ............................... 423/130 |
| 4,117,105 | 9/1978 | Hertzenberg et al. ............... 423/625 |
| 4,157,382 | 6/1979 | Goodboy et al. ................... 423/628 |
| 4,215,094 | 7/1980 | Inao et al. ........................... 423/130 |
| 4,263,261 | 4/1981 | Yamada et al. ..................... 423/130 |
| 4,280,987 | 7/1981 | Yamada et al. ..................... 423/130 |
| 4,492,682 | 1/1985 | Trebillon ............................. 423/626 |
| 4,581,208 | 4/1986 | The et al. ............................ 423/130 |
| 4,663,133 | 5/1987 | Malito et al. ........................ 423/130 |
| 4,668,486 | 5/1987 | Brown et al. ....................... 423/130 |

FOREIGN PATENT DOCUMENTS

| | | | |
|---|---|---|---|
| 1178049 | 4/1964 | Fed. Rep. of Germany ...... 423/124 |
| 1381282 | 11/1964 | France ................................ 423/625 |
| 382366 | 10/1932 | United Kingdom ............... 423/124 |

Primary Examiner—Theodore Morris
Assistant Examiner—Paige C. Harvey
Attorney, Agent, or Firm—Darby & Darby

[57] ABSTRACT

A process for the production of large boehmite crystal aggregates, useful for soft polishing applications is provided herein. A caustic aluminate liquor is contacted with an oxygen-containing gas at elevated temperatures and pressures in the presence of about 1-50 mg/L of copper ions. The liquor is oxidized until a molar ratio of $Na_2O_{free}$ to $Al_2O_3$ of less than or equal to 1 is achieved, and the oxidized liquor is cooled under quiescent conditions of little or no agitation which causes the crystallization and precipitation or novel large boehmite particles.

22 Claims, 6 Drawing Sheets

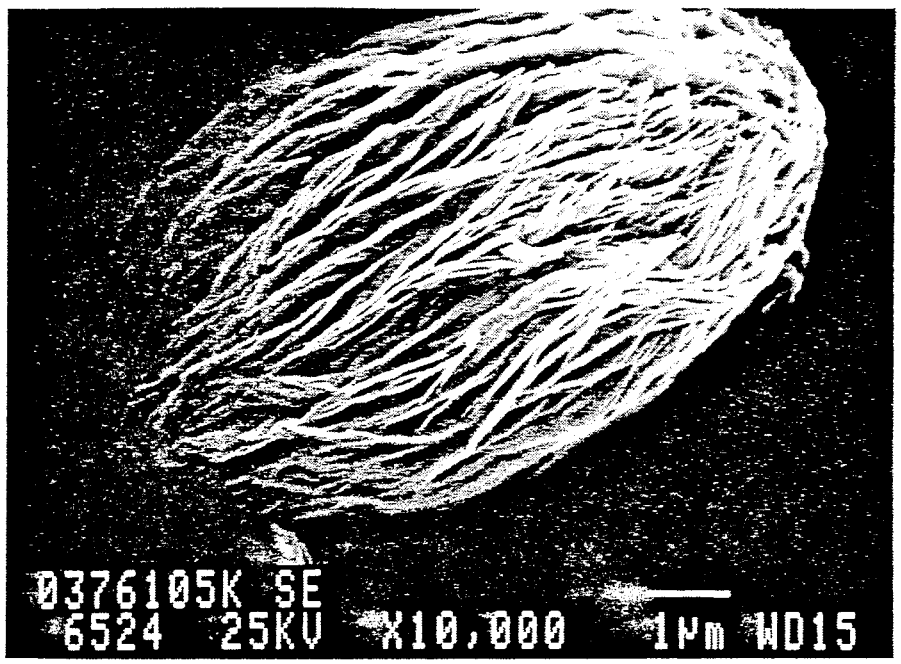
FIG. IA
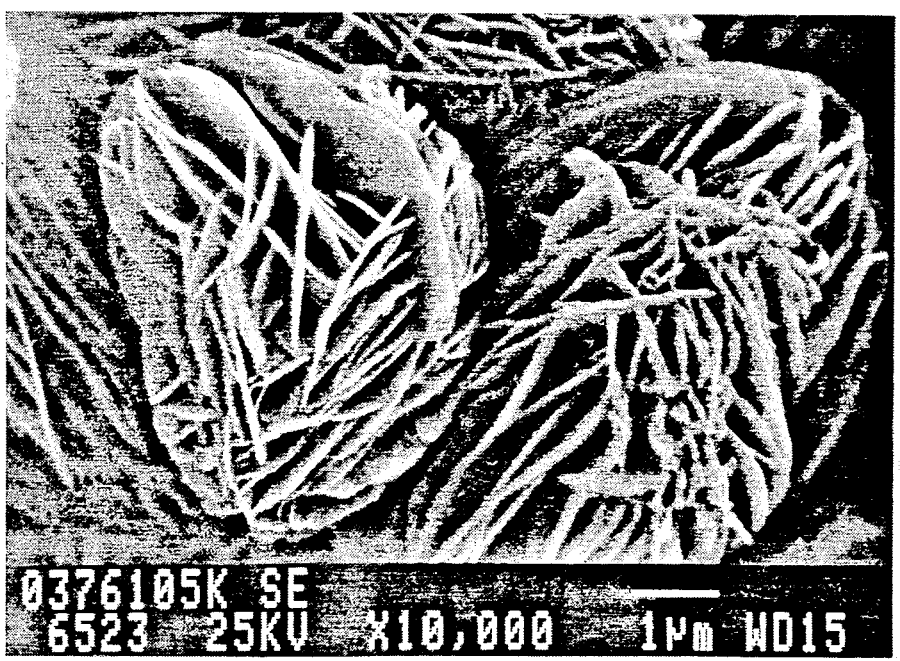
FIG. IB

FIG. 6A
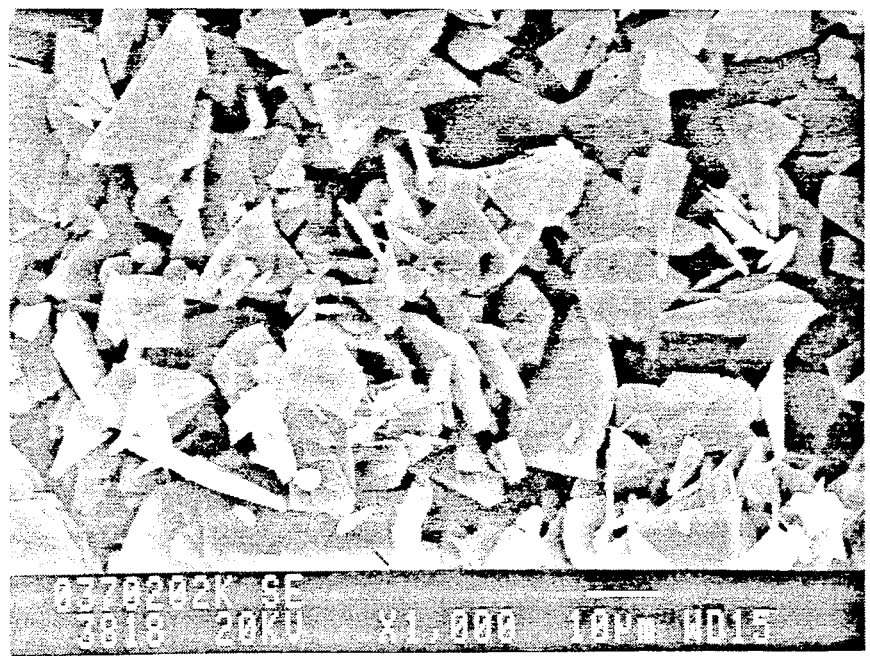

PROCESS FOR THE PRODUCTION OF LARGE BOEHMITE PARTICLES

This is a continuation of application Ser. No. 017,281, filed Feb. 20, 1987, now abandoned which is a C-I-P of application Ser. No. 847,634 filed Apr. 3, 1986, now U.S. Pat. No. 4,668,486 and C-I-P of application Ser. No. 017,308, filed Feb. 20, 1987, now abandoned.

FIELD OF THE INVENTION

The present invention relates to a process for the production of alpha-alumina monohydrate (boehmite) crystals and crystal aggregates of a size and form suitable for use in soft polishing formulations.

BACKGROUND OF THE INVENTION

Aluminum hydroxides, in general, and boehmite, in particular, are widely used in soft polishing formulations where the abrasive is mixed with either wax, grease, oil or water to form a block, paste or liquid suspension. The important properties of the abrasive which affect its polishing ability relate to the size, shape and friability (the property of readily crumbling under the pressure exerted during polishing) of the particles. In very general terms, coarse particles provide a cutting action but leave a poor surface finish, whereas fine particles will remove less material but can provide a good surface finish. Until now, a scratch on a plastic surface or a metallic finish would require both an abrasive and a buffing material. The present invention provides a process for the production of boehmite of a size and structure which enables the two polishing actions to be applied consecutively from a single abrasive powder, so that cutting action (to remove surface blemishes, scratches, etc.) and smooth surface finishing can be combined in a single polishing formulation.

It is known that boehmite is the thermodynamically stable phase of aluminum monohydrate at temperatures above 100° C. in caustic aluminate liquors of the well-known Bayer process for the production of alumina from bauxite. Accordingly, fine crystals of boehmite can be precipitated out of these solutions at temperatures above 100° C. Of greater commercial significance is the method of producing boehmite whereby aluminum trihydroxide (gibbsite) from the Bayer process is digested in water or steam under hydrothermal conditions (See, for example, U.S. Pat. No. 3,954,957 of Koenig issued May 4, 1976.) In the Gibbsite process, the presence of an acid or alkali is beneficial in accelerating the digestion and controlling the particle size of the boehmite product. Although the individual boehmite crystals produced by this process are generally very small, less than 1 micron, they can form aggregates of 40–60 microns in size. However, the aggregate particles are fragile and unstable, releasing many of the fine crystallites as free entities, which limits the usefulness of the thus prepared boehmite. While useful in a number of other applications, such prior art particles are not suitable for a polishing application where an initial cutting action followed by a surface finishing action is required. Both actions should be performed by a single formulation useful for polishing, for example, plastic spectacle lenses, synthetics, car paint, lacquered finishes and the like.

As described in copending U.S. patent application Ser. No. 847,634, now U.S. Pat. No. 4,668,486, a Bayer spent liquor, i.e., a liquor having a high $Na_2O_{free}/Al_2O_3$ molar ratio and a low alumina content, when subjected to organics oxidation (i.e., a process for removing from the Bayer liquors organic contaminants present in the original bauxite used) in the presence of copper catalyst ions, can be induced to precipitate about 50% of its alumina content as copper-containing boehmite. The boehmite recovered from this process has a relatively high amount of copper content between about 0.35% and 0.70%, depending upon the amount of copper used as a catalyst and the amount of boehmite crystallized. This process is conducted under hydrothermal conditions (elevated pressure and temperature) and the copper-containing boehmite is recycled as a catalyst/catalyst carrier system. No seeding of the liquor is necessary for boehmite crystallization. Moreover, the retention time requirement (the amount of time that the liquor to be oxidized must remain within the autoclave) for the combined organics oxidation - boehmite crystallization is of the order of one hour or less. However, the boehmite precipitated by this process is not suitable for soft polishing applications principally because of the small particle size of the resultant boehmite crystals.

The present inventor has unexpectedly discovered that if the organics oxidation of caustic aluminate liquors (i.e. the process of removing organic carbon contaminants from caustic aluminate, liquors, such as Bayer process liquors) is conducted under conditions of greatly reduced copper concentration, i.e. consistent with copper levels in boehmite up to no more than approximately 0.1%, then the particle size and the structure of the resulting boehmite aggregates are such as to render it well-suited for use in, for example, soft polishing applications, where both cutting and finishing actions are desireable in a single formulation.

It is an object of the present invention to provide a process for the production of large boehmite crystal aggregates of novel crystalline structure.

It is a further object of the present invention to provide a novel form of boehmite containing small amounts of copper suitable for use in soft polishing formulations.

These and other objects of the present invention will be apparent to those of ordinary skill in the art in light of the present description, accompanying claims, and appended drawings.

BRIEF DESCRIPTION OF THE DRAWINGS

FIGS. 1(a) and 1(b) are scanning electron micrographs, 10,000×, of prior art boehmite crystals, which contain relatively large amounts of copper.

FIG. 4 is another view of a scanning electron micrograph (1,500×) showing the large boehmite particles of the present invention.

FIG. 5 is yet another view of a scanning electron micrograph (1,300×) showing the large boehmite aggregate particles of the present invention.

FIGS. 6(a) and 6(b) are scanning electron micrographs (1000×) demonstrating the collapse of the large boehmite particles under the applied pressure of a typical polishing action.

SUMMARY OF THE INVENTION

Figure 2:
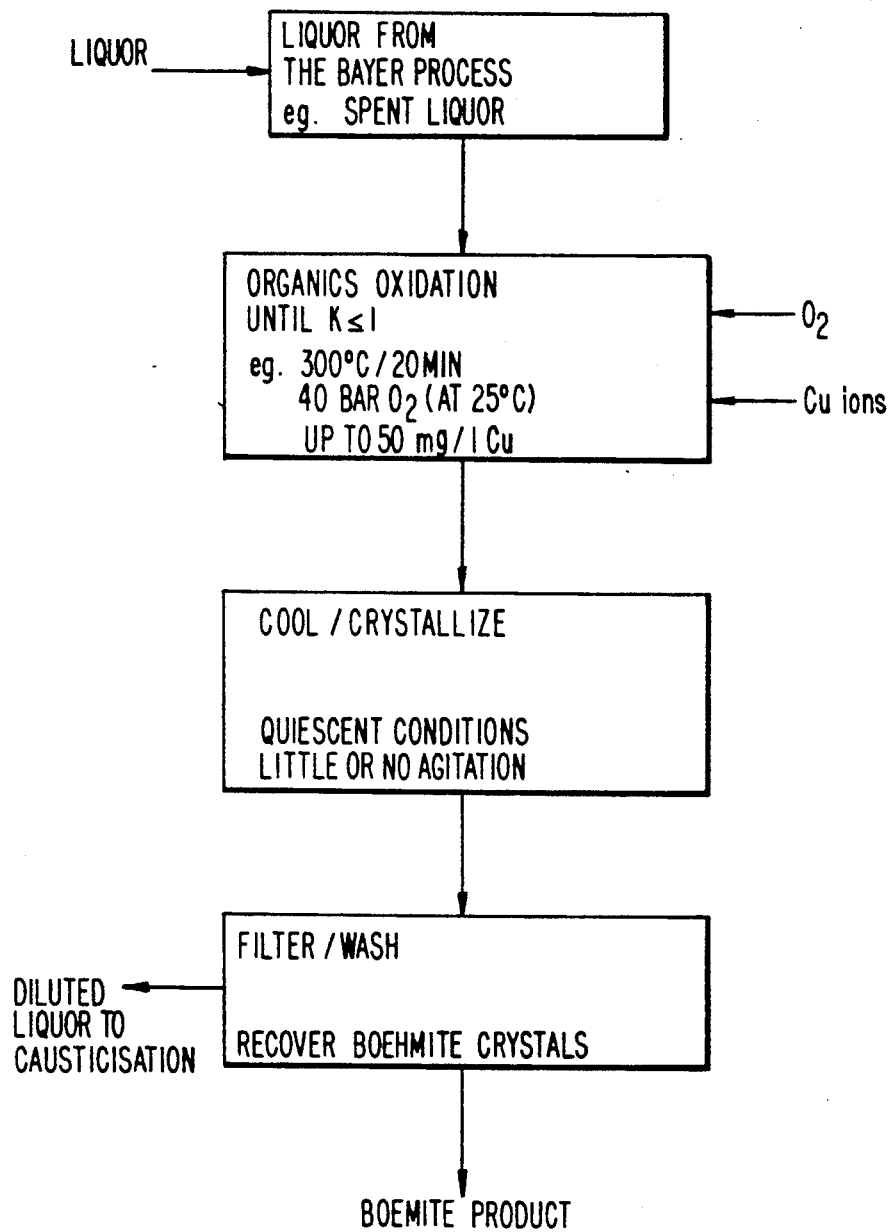
FIG. 2 is a flow sheet diagramming a preferred embodiment of the present invention.

In one aspect, the present invention provides a process for producing novel, large boehmite crystal aggregates. The process comprises contacting a caustic aluminate liquor with an oxygen-containing gas at elevated temperatures and pressures in the presence of about 1-50 mg/l of copper ions. The liquor is oxidized until a molar ratio of $Na_2O_{free}$ to $Al_2O_3$ of less than or equal to one is achieved. The oxidized liquor is then cooled under quiescent conditions i.e. with little or no agitation, which causes boehmite mite crystallization. Typically, the boehmite aggregates produced are substantially in the size range of 20-200 microns, with at least approximately 95% of the product being in that size range. (Individual crystals are typically 5-25 microns in average diameter.)

In another aspect, the invention provides a boehmite product, with particles substantially within the size range between about 20 and about 200 microns. Preferably, the crystals within the particles have a high aspect ratio ranging between about 20:1 to about 40:1, while the particles have a low bulk density of 50-200 kg/m$^{-3}$, and a loss on ignition of 15%.

The boehmite product is also characterized by the complete absence of any other forms of alumina or hydrated alumina.

DETAILED DESCRIPTION OF THE INVENTION

A novel method has been identified for producing boehmite particles of a novel shape and structure which renders them particularly suitable for use in soft polishing applications, where combined cutting and finishing actions are present in a single formulation.

Copending U.S. patent application Ser. No. 847,634, now U.S. Pat. No. 4,668,486 discloses a process for removing carbon contaminants from Bayer process liquors. In this process, carbon contaminants present in these liquors are oxidized by contacting the liquor with an oxygen-containing gas under, for example, 40 bar $O_2$ (at 25° C.) pressure, and 120°-300° C. for 10-60 minutes in the presence of 1-5000 mg/L, and preferably 500 mg/L of copper ions (added as catalysts). This is known as copper-catalyzed organics oxidation. Boehmite will precipitate out of solution in the autoclave (after organics oxidation) as the system is cooled back down to conditions of atmospheric pressure and temperature, if the following critical condition is attained in the oxidized liquor:

$K \leq 1$ where: K is defined as the molar ratio of $Na_2O_{free}/Al_2O_3$ in the liquor.

When the numerical value of K for the oxidized liquor is less than or equal to 1, boehmite precipitates out of the oxidized liquor during the cooling step of the process. The crystals obtained using the process of 847,634, now U.S. Pat. No. 4,668,486 are shown in the scanning electron micrographs (SEM) shown in FIGS. 1(a) and 1(b).

The present inventor has unexpectedly discovered that if the organics oxidation is carried out under very small copper concentrations (added as a catalyst for the oxidation reaction) compared to the range of those employed in the aforementioned application Ser. No. 847,634, now U.S. Pat. No. 4,668,486 and if the boehmite is precipitated under quiescent conditions of little or no agitation during the cooling down of the oxidized liquor, then the boehmite crystals which are produced are of a novel size and form and have novel properties. The concentration of copper added to the Bayer liquor used to obtain these novel crystals is broadly within the range between about 1 and about 50 mg/L. At copper concentrations of greater than 50 mg/L, (assuming that about 50 g/L of boehmite is typically produced), the resultant boehmite particles begin to take on the form of those shown in FIGS. 1(a) and 1(b). The particles become progressively smaller and more compact, and less plate-like, as the amount of the copper in these boehmite particles increases. At concentrations of less than 1 mg/L of copper, boehmite particles will form but in progressively decreasing amounts, since the minimum amount of copper in spangles is 0.001%.

In accordance with the present invention, a caustic aluminate liquor, such as a Bayer process liquor is obtained. The liquor is oxidized by contacting it with an oxygen-containing gas at elevated pressure and temperature (usually in an autoclave) in the presence of 1-50 mg/l copper ions. The broad pressure and temperature operating per ions ranges are from about 120° C. and 40 bar $O_2$ to about 300° C. and 150 bar total pressure. Preferred operating ranges for this step are between about 260° to about 300° C. and between about 20 and 40 bar $O_2$ (at 25° C). Organics oxidation is carried out until a molar ratio of $Na_2O_{free}$ to $Al_2O_3$ of less than or equal to 1 is achieved. The retention time (the time the liquor must be retained under increased pressure and temperature) for this step is typically between 10 and 60 minutes. The liquor is then cooled under quiescent conditions of little or no agitation and the boehmite crystals of the present invention precipitate. The amount of agitation needed is a function of the reactor (i.e., autoclave) design. No agitation is required if the precipitated particles can be easily removed after settling on the bottom of Scanning electron microscopy (SEM) indicated that the boehmite particles are composed of an interlocking network of thin, non-oriented plate-like crystals of high aspect ratio (i.e. the ratio of basal plane axis to vertical axis, with the basal planes assumed to be horizontal), with the individual crystals being in the range of 5-25 microns in size (longest dimension). Non-oriented is defined as an aggregate particle in which the crystals are situated at angles of more than 20° relative to each other. Under the applied pressure of a simulated polishing action, the boehmite particles, which are relatively fragile, collapse to their individual platelets in a flat configuration, a structure which effects only a final buffing action.

Fairly wide variations within the particle size range of 20-200 microns and crystal platelet size range of 5-25 microns will not affect the basic polishing properties of the boehmite particles provided that the aggregate structure of the particles is retained. A substantial number of unaggregated particles (more than about 20%) would not be acceptable.

The boehmite product of the present invention has, to the naked eye, a distinctive appearance and is relatively coarse and "sandy" in texture. It is also white, consistent with the low copper content and organics oxidation and has a low bulk density ranging from about 50 to about 200 kg m$^{-3}$.

Figure 3:
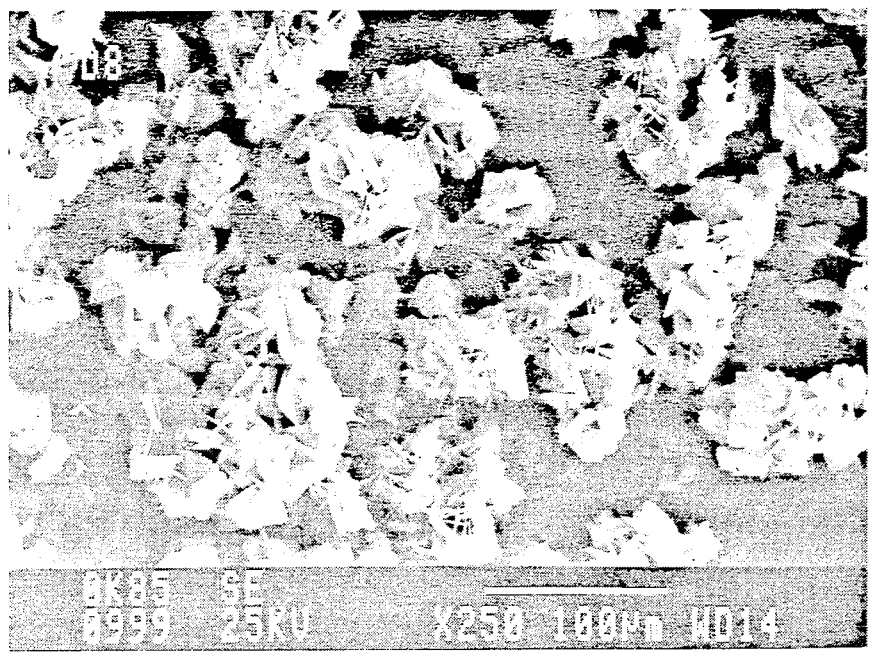
FIG. 3 is a scanning electron micrograph (250×) showing the large boehmite aggregates of the present invention.

The boehmite aggregates produced, containing 0.001 to 0.1% copper ions, contain rectangular, flat plates of boehmite arranged in a form as shown in FIG. 3. The copper ions are located between the aluminum hydroxide layers in the crystal lattice. The aggregates are composed of an interlocking network of approximately 100 crystal platelets. Upon examination by X-ray diffraction, the crystals produced were 100% boehmite and demonstrated a complete absence of any other form of alumina. the reactor. If the reactor design is such that the precipitated particles cannot be easily washed out at the end of a reaction, then a small amount of mechanical agitation can be provided to prevent the settling of the boehmite.

A flow diagram, showing typical operating conditions for a preferred embodiment of the present invention, is presented in FIG. 2.

The copper content of the copper-containing boehmite crystals of the present invention is in the range between about 0.001% to about 0.1% copper based on the boehmite. These copper levels in the crystal lattice are considerably lower than those described in U.S. patent application Ser. No. 847,634, now U.S. Pat. No. 4,668,486 where the copper-containing boehmite is used as the catalyst/catalyst carrier system.

Examples of the complex structure of the copper-containing boehmite particles of the present invention are shown in FIGS. 3–5. At these lower copper levels, the particle structures are radically different from those of the prior application. In FIGS. 3–5, for example, the boehmite spangles which form have a copper content of only 0.013%, as opposed to the copper content of 0.7% in the working examples of application 847,634, now U.S. Pat. No. 4,668,486. The boehmite crystals of the present invention are thin, plate-like crystals of high aspect ratio (the ratio of basal plane axis to vertical axis, with the crystal plane assumed to be in a horizontal position), i.e., about 40:1.

In an alternative embodiment of the present invention, a caustic aluminate liquor, such as a Bayer liquor is obtained which is low in $Al_2O_3$ concentration and has a molar ratio, "K", higher than 1. Aluminum trihydroxide (gibbsite) is added and then dissolved at a temperature of between about 180° C. to 190° C. (i.e. above the boehmite nucleation temperature), under a pressure of about 10–13 bar, in order to alter the molar ratio to a value of less than or equal to 1. $CO_2$ gas can also be injected in order to adjust the molar ratio, "K", to less than or equal to 1. In the latter case, the gas reacts with the $Na_2O_{free}$ present in the liquor and therefore lowers the $Na_2O_{free}$ concentration. The amount of $CO_2$ gas to be introduced is calculated on the basis of how much $Na_2O_{free}$ must be converted to sodium carbonate in order to lower the value of K to less than or equal to one. $CO_2$ is then introduced into the liquor in the autoclave and small samples (2 ml) are removed and analyzed for $Na_2O_{free}$ present in the liquor by monitoring the pH of the solution. The pH decreases as the $CO_2$ and $Na_2O_{free}$ combine to form sodium carbonate. When the desired concentration of $Na_2O_{free}$ is reached, $CO_2$ gas bubbling is stopped. In either case, after organics oxidation, the liquor is then cooled and boehmite crystals of the present invention are precipitated.

The concentration of the cooper dissolved in the oxidized liquor at the time of boehmite precipitation is an important parameter, as it affects the subsequent form of crystal growth that occurs. The upper limit on the amount of copper present in the liquors to be used in the present invention is approximately 0.05 g/L copper. The boehmite crystals according to the present invention should have no more than about 0.1% copper content.

Copper hydroxide, copper oxide, or copper sulfate are non-limiting examples of the copper catalyst which can be used in the practice of the present invention.

Another parameter that affects crystal form is the level of agitation during the cooling of the organics-oxidized liquor. Cooling should take place with little or no agitation (quiescent conditions). By little agitation, it is meant that amount of agitation sufficient to prevent settling out of solids in the autoclave. If more than this minimal agitation is provided, the resulting boehmite crystals will not develop the required particle size or structure.

The advantages of combining boehmite precipitation with organics oxidation of a Bayer liquor are at least 2-fold. First, the boehmite product is not contaminated with the colored organics normally present in Bayer liquors. Second, the boehmite product yield can be substantially increased by digesting additional alumina-containing compounds, such as aluminum trihydroxide, in the liquor to be oxidized at high temperatures under an oxygen atmosphere. Aluminum trihydroxide can be dissolved up to about 200 g/L alumina at 300° C. in 140 g/L $Na_2O_{free}$ liquor under a pressure of up to about 150 bar.

Alternatively, if boehmite product whiteness and high liquor productivity are not major considerations, then the experimental conditions can be relaxed and an injection of $CO_2$ gas can be used as an alternative or partial alternative to the addition of organic carbon compounds, mentioned above. Thus, reaction temperatures can be lowered to within the range of about 150° C. to about 300° C. and an air atmosphere can be used instead of an oxygen-enriched gas. 150° C. is regarded as the optimum temperature for boehmite crystallization regardless of how the liquor was treated prior to this stage.

The properties of typical boehmite product produced by this process are as follows:

TABLE 1

| | |
|---|---|
| Average particle size | = 20–200 microns |
| Percent soda | = 0.20–0.25% |
| Percent boehmite | = 100% |
| | (by X-ray Diffraction) |
| Loss-on-Ignition | = 15.0% (i.e. theoretical) |
| Bulk Density | 50–200 kg m$^{-3}$ |
| Copper content | = 0.05–0.10%* |

*i.e. approx. 1/10th of the amount of copper present in copper-boehmite as catalyst-/catalyst carrier system in organics oxidation of Bayer liquor.

Scanning electron microscopy (SEM) analysis of the boehmite product is shown in FIGS. 3–5. The aggregate particles are composed of an interlocking network of large, plate-like crystals of high aspect ratio. An estimated measure of the aspect ratio from enlarged SEM micrographs is 0:1 to 40:1, with the largest dimension of the plate-like crystals being up to approximately 25 microns in size. The individual platelets are well-defined with sharp boundaries, indicative of high crystallinity. Without wishing to be bound by any theoretical considerations, it is believed that the development of the particle structure is due to growth of the individual nucleated particles rather than to a continual creation of new crystals which then come together to form the aggregates.

The present invention is described below in specific examples which are intended to further describe the invention without limiting its scope.

EXAMPLE 1

30 ml of Bayer spent liquor was obtained of the following composition

| | |
|---|---|
| $Na_2O_{free}$ | = 138.3 g/l |
| $Al_2O_3$ | = 86.5 g/l |
| Organic Carbon | = 27.1 g/l |
| Sodium Oxalate | = 3.4 g/l |

The liquor was oxidized in 100 ml stainless steel autoclave at a temperature of 300° C. for 20 minutes in the presence of 20 mg/l of copper, added as $CuSO_4 \cdot 5H_2O$; oxygen gas had been introduced into the autoclave up to the pressure of 40 bar (as measured at 25° C.). The oxidized liquor was cooled back to approximately 80° C. under conditions of little or no agitation, during which a quantity of boehmite crystals, weighing 1.42 g precipitated out of solution. The composition of the oxidized liquor in the autoclave was:

| | |
|---|---|
| $Na_2O_{free}$ | = 44.6 g/l |
| $Al_2O_3$ | = 39.2 g/l |
| Organic Carbon | = 8.4 g/l |
| Sodium Oxalate | = 3.8 g/l |

The organics oxidation efficiency was thus about 69%. The boehmite crystals of the present invention contained 0.013% copper, i.e. approximately half the amount added initially, while the oxidized liquor had less than 1 mg/l Cu. The particles produced are shown in FIGS. 3, 4 and 5.

EXAMPLE 2

THE POLISHING EFFECT OF BOEHMITE SPANGLES

A number of tests were performed in order to demonstrate the unique properties of the boehmite particles of the present invention when utilized in a polishing formulation.

The first test carried out was to spread a layer of the boehmite crystals, obtained by the process of the present invention, on a microscope glass slide, place another slide on top and apply pressure directly between the thumb and index finger. The boehmite particle structures collapsed into their individual plates, upon the application of pressure, as shown in FIGS. 6(a) and 6(b), demonstrating their friability.

In a second test, a layer of the boehmite particles of the present invention was adhered onto the surface of an SEM "stub" sample holder (a cylindrical flat-capped metal sample holder, measuring 1 cm surface diameter and 1 cm long and used for SEM studies) using double-sided adhesive tape (available as Tesaband, Bayer AG, Hamburg, Germany), and then moved in a light polishing action (by hand) over the surface of a microscope glass slide. As seen above, the boehmite particle structure collapsed. In addition, a most important finding of this test was that no scratches could be observed on the glass surface.

In a third test, the boehmite particles used in the second test above, where moved in a polishing action, i.e., 10-20 strokes under hand pressure, over a roughened aluminum surface test piece. The boehmite particles behaved similarly as above, and the rough surface layers of the aluminum surface were clearly removed by the boehmite particles. The end result was an aluminum surface free of scratches and surface blemishes.

The present invention has been described above with reference to preferred embodiments. It would be obvious to those of ordinary skill in the art that many additions, deletions and substitutions could be made without departing from the spirit and scope of the invention as claimed below.

What is claimed is:

1. A process for the production of alpha-alumina monohydrate aggregates comprising the steps of:
   contacting a caustic aluminate-containing liquor held under a pressure of between about 20 bar and about 150 bar $O_2$, at a temperature of between about 120° C. and 300° C. and in the presence of an amount of cooper ions from about 1 to about 50 mg/l with an oxygen-containing gas to adjust the molar ratio of $Na_2O_{free}$ to $Al_2O_3$ of the oxidized liquor to <1;
   cooling said oxidized liquor without any agitation to induce nucleation of alpha-alumina monohydrate particles having a particle size between about 20 and about 200 microns and containing between about 0.001% and 0.1% copper; and
recovering said alpha-alumina monohydrate particles in aggregate particle form.

2. The process according to claim 1 wherein the molar ratio of said oxidized liquor is attained by adding aluminum hydroxide or aluminum compounds to the liquor prior to said contacting step.

3. The process according to claim 1 which comprises injecting $CO_2$ gas in an appropriate amount to adjust said molar ratio to less than or equal to 1, prior to, during or directly following said contacting step, 4. The process according to claim 3 wherein said alpha-alumina monohydrate product has an alumina content which consists essentially of 100% alpha-alumina monohydrate, said product comprises crystal platelets having a diameter within the range of between about 5 and about 25 microns.

5. An alpha-alumina monohydrate crystalline aggregate comprising non-oriented crystal platelets of alpha-alumina monohydrate and form about 0.001 to about 0.1% of copper, said crystal platelets forming an open structure of low bulk density of less than 200 kg per $m^3$ wherein said alpha-alumina monohydrate crystalline aggregate collapses under applied pressure to individual crystal platelets during use of said alpha-alumina monohydrate-crystalline aggregate in a polishing application.

6. An alpha-alumina monohydrate aggregate comprising alpha-alumina monohydrate crystals platelets containing 0.001-0.1% copper, the longest dimension of said crystals platelets being between about 5 and about 25 microns.

7. The alpha-alumina monohydrate aggregate of claim 6 having individual platelets crystals and an aspect ratio of between about 20:1 to about 40:1, a low bulk density of between about 50 to about 200 kg per $m^3$, and a loss-on-ignition of about 15%.

8. An alpha-alumina monohydrate aggregate comprising a crystal lattice of alpha-alumina monohydrate, said crystal lattice containing aluminum hydroxide layers and copper ranging between about 0.001 to about 0.1%, said copper located between the aluminum hydroxide layers in the crystal lattice.

9. An alpha-alumina monohydrate alpha-alumina monohydrate aggregate of between 100 and 200 microns in diameter, said aggregate comprising an interlocking network of approximately 100 crystal platelets containing alpha-alumina monohydrate, and 0.001 to 0.1% of copper, each of said crystals platelets having a diameter of between about 5 microns and about 25 microns.

10. A process for the production of alpha-alumina monohydrate aggregates useful in soft polishing applications which comprises the steps of:
adjusting a caustic aluminate liquor containing from about 1 to 50 mg/l of copper ions to a molar ratio of $Na_2O_{free}$ to $Al_2O_3$ of $\leq$ to 1;
subjecting said caustic aluminate liquor to a temperature of at least about 150° C. and a pressure of between about 20 bar and about 150 bar;
cooling said liquor under quiescent conditions to precipitate said alpha-alumina monohydrate aggregates, and recovering said alpha-alumina monohydrate aggregates, wherein said alpha-alumina aggregates contain between about 0.001 to 0.1% copper and comprise crystal platelets having a diameter of between about 5 and about 25 microns.

11. The process of claim 10 comprising obtaining said caustic aluminate liquor with a molar ratio of less than or equal to one by adding to a first liquor having a molar ratio of more than one aluminum trihydroxide in an amount sufficient to decrease the molar ratio to less than or equal to one.

12. The process of claim 10 comprising obtaining said caustic aluminate liquor with a molar ratio of less than or equal to one by injecting a first liquor with a molar ratio of more than one with an amount of $CO_2$ gas sufficient to carbonate an amount of $Na_2O_{free}$ sufficient to lower said molar ratio to less than or equal to one.

13. The process of claim 10 comprising obtaining said caustic aluminate liquor with a molar ratio of less than or equal to one from a first liquor with a molar ratio of more than one by both adding aluminum trihydroxide to raise the $Al_2O_3$ content of said caustic aluminate liquor and injecting $CO_2$ gas to carbonate $Na_2O_{free}$, thereby lowering the $Na_2O_{free}$ content of said caustic aluminate liquor; the amounts of said $CO_2$ and aluminum trihydroxide being sufficient in combination to alter the molar ratio of said caustic aluminate liquor to less than or equal to one.

14. The process of claim 10 wherein said caustic aluminate liquor with a molar ratio of more than one also contains organic carbon, said process further comprising oxidizing at least a portion of said organic carbon prior to said cooling step.

15. The process of claim 14 wherein said oxidizing step comprises contacting said caustic aluminate liquor with an oxygen-containing gas under an elevated pressure of between about 20 bar $O_2$ and about 150 bar $O_2$ and at a temperature between about 150° C. and about 300° C.

16. The process of claim 14 wherein said oxidation process is at least in part responsible for obtaining a liquor with a molar ratio of less than or equal to one, said oxidation of said organic carbon resulting in formation of $CO_2$ which in turn carbonates said $Na_2O_{free}$.

17. The process of claim 14 which comprises adding a sufficient quantity of organic carbon to said caustic aluminate liquor to adjust the molar ratio of said caustic aluminate liquor to less than or equal to one, said organic carbon being added to said caustic aluminate liquor prior to said oxidizing step.

18. Alpha-alumina monohydrate crystal aggregate particles comprising a crystal lattice of alpha-alumina monohydrate, said crystal lattice containing aluminum hydroxide layers and between about 0.001 to about 0.1% of cooper, based on said alpha-alumina monohydrate and said alpha-alumina monohydrate having an average size within the range of about 20 to about 200 microns.

19. The particles of claim 18 wherein said copper is embedded between aluminum hydroxide layers in said crystal lattice.

20. The particles of claim 18 comprising individual platelet crystals said platelet crystals having an aspect ratio within the range between about 20:1 and about 40:1, a bulk density within the range between about 50 and about 200 kg/m$^3$ and a loss-on-ignition of about 15%.

21. The alpha-alumina monohydrate particles of claim 18 having an alumina content which consisting essentially of 100% alpha-alumina monohydrate.

22. Alpha-alumina monohydrate crystal aggregate particles comprising non-oriented crystal platelets of alpha-alumina monohydrate, said crystals platelets ranging between about 5 and about 25 microns in diameter and forming an open structure having a bulk density below about 200 kg/m$^3$, said alpha-alumina monohydrate crystal aggregrate particles collapsing upon application of such pressure to individual as is normally applied during soft polishing applications.

* * * * *